(12) United States Patent
Kim et al.

(10) Patent No.: US 12,225,327 B2
(45) Date of Patent: Feb. 11, 2025

(54) SURVEILLANCE SYSTEM EMPLOYING PLURALITY OF UNMANNED AERIAL VEHICLES

(71) Applicants: KOREA UNIVERSITY RESEARCH AND BUSINESS FOUNDATION, Seoul (KR); AJOU UNIVERSITY INDUSTRY—ACADEMIC COOPERATION FOUNDATION, Suwon-si (KR)

(72) Inventors: Joongheon Kim, Seoul (KR); Soyi Jung, Seoul (KR); Jae-Hyun Kim, Seoul (KR); Won Joon Yun, Seoul (KR); SooHyun Park, Incheon (KR)

(73) Assignees: Korea University Research and Business Foundation, Seoul (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 22 days.

(21) Appl. No.: 18/139,683

(22) Filed: Apr. 26, 2023

(65) Prior Publication Data
US 2023/0370569 A1 Nov. 16, 2023

(30) Foreign Application Priority Data
May 16, 2022 (KR) .......................... 10-2022-0059786

(51) Int. Cl.
*H04N 7/18* (2006.01)
*B64U 10/00* (2023.01)
*B64U 101/20* (2023.01)
*B64U 101/31* (2023.01)
*H04N 23/661* (2023.01)

(52) U.S. Cl.
CPC ............. *H04N 7/181* (2013.01); *B64U 10/00* (2023.01); *H04N 23/662* (2023.01); *B64U 2101/20* (2023.01); *B64U 2101/31* (2023.01)

(58) Field of Classification Search
CPC ........ H04N 7/181; H04N 23/662; H04N 7/18; H04N 23/815; B64U 10/00; B64U 2101/20; B64U 2101/31; B64U 2101/30; B64C 39/024
See application file for complete search history.

(56) References Cited

U.S. PATENT DOCUMENTS

| | | | |
|---|---|---|---|
| 2022/0036050 A1* | 2/2022 | Chandler | G06V 40/20 |
| 2022/0116531 A1* | 4/2022 | Georgis | H04R 1/406 |
| 2023/0058405 A1* | 2/2023 | Chen | G05D 1/0094 |

FOREIGN PATENT DOCUMENTS

| | | |
|---|---|---|
| KR | 10-2016-0070375 A | 6/2016 |
| KR | 10-1821992 B1 | 3/2018 |
| KR | 10-2018-0065756 A | 6/2018 |

(Continued)

*Primary Examiner* — Nasim N Nirjhar
(74) *Attorney, Agent, or Firm* — NSIP Law (57) ABSTRACT

Provided is a surveillance system employing a plurality of unmanned aerial vehicles (UAVs), the surveillance system showing improved surveillance performance while optimizing common energy consumption for computing of all the UAVs and also providing a stable visual monitoring service using autonomous mobility of the plurality of UAVs regardless of movement of an object to be monitored and action uncertainty of an adjacent UAV.

7 Claims, 12 Drawing Sheets

(56) References Cited

FOREIGN PATENT DOCUMENTS

| | | |
|---|---|---|
| KR | 10-2019-0006634 A | 1/2019 |
| KR | 10-1964001 B1 | 3/2019 |
| KR | 10-2019-0053018 A | 5/2019 |
| KR | 10-1946429 B1 | 5/2019 |
| KR | 10-2019-0107410 A | 9/2019 |
| KR | 10-2032067 B1 | 10/2019 |
| KR | 10-2020-0097070 A | 8/2020 |
| KR | 10-2021-0078164 A | 6/2021 |
| KR | 10-2267764 B1 | 6/2021 |
| KR | 10-2305159 B1 | 9/2021 |

\* cited by examiner

(a) Total Reward (b) Training Loss

(a) Resolution (b) Support Rate

SURVEILLANCE SYSTEM EMPLOYING PLURALITY OF UNMANNED AERIAL VEHICLES

CROSS-REFERENCE TO RELATED APPLICATION

This application claims priority to and the benefit of Korean Patent Application No. 10-2022-0059786, filed on May 16, 2022, the disclosure of which is incorporated herein by reference in its entirety.

BACKGROUND

1. Field of the Invention

The present invention relates to a technology for a surveillance system employing a plurality of unmanned aerial vehicles (UAVs), and more particularly, to a surveillance system employing a plurality of UAVs which shows improved surveillance performance while optimizing common energy consumption for computing of all the UAVs and also provides a stable visual monitoring service using autonomous mobility of the plurality of UAVs regardless of movement of an object to be monitored and action uncertainty of an adjacent UAV.

2. Discussion of Related Art

With recent technological developments, unmanned aerial vehicles (UAVs) are now considered key aircrafts for providing a flexible and reliable surveillance network service. UAVs are capable of autonomous flight and visual monitoring services. In particular, as the technology of the information technology (IT) field is applied to the aviation field, various results of drone-based research are coming out. Also, research on swarm flight in which multiple drones collaborate to increase the probability of mission success or shorten mission execution time is attracting attention.

A large number of documents have been disclosed to effectively improve existing flight missions using multiple drones which perform swarm flight (hereinafter, "swarm drones"). Among the documents, Korean Patent No. 10-2029222 (hereinafter, "related art document 1") discloses a technology for exploring a certain area using swarm drones.

However, to solve the problem of resource limitation that occurs in the case of processing images using swarm drones, related art document 1 is focused on a technology that utilizes an offloading technique in which a server is entrusted with data processing and only the result is returned.

Therefore, the present inventor proposes a new technology for increasing the efficiency of an artificial intelligence (AI) algorithm processing process for flight and surveillance, reducing energy consumption for flight and surveillance by lowering the amount of computer calculation, and further achieving reliability of a network surveillance service of UAVs.

RELATED ART DOCUMENTS

Patent Documents (Patent document 1) Korean Patent No. 10-2029222 (registered on Sep. 30, 2019)

(Patent document 2) Korean Patent Application No. 10-2018-0084345 (published on Jul. 25, 2018)

SUMMARY OF THE INVENTION

The present invention is directed to providing a surveillance system employing a plurality of unmanned aerial vehicles (UAVs) which shows improved surveillance performance while optimizing common energy consumption for computing of all the UAVs.

The present invention is also directed to providing a surveillance system employing a plurality of UAVs which provides a stable visual monitoring service using autonomous mobility of a plurality of UAVs regardless of movement of an object to be monitored and action uncertainty of an adjacent UAV.

According to an aspect of the present invention, there is provided a surveillance system employing a plurality of UAVs each of which communicates with a UAV management device through a wireless communication network and includes a camera module, a sensor module, a communication module, a memory module, a movement module, a movement control module, a processor, a battery, and a power management module. The plurality of UAVs include agent UAVs and a leader agent UAV which wirelessly communicates with the agent UAVs.

The agent UAVs calculate first state data including absolute location information, relative location information, energy information required for flight and surveillance, and surveillance information using information input from the camera modules and the sensor modules, transmit the first state data to the leader agent UAV, generate first movement action data and resolution adjustment data for a first surveillance image by inputting the first state data to a first neural network algorithm, and then fly according to the generated first movement action data and adjust surveillance ranges according to the resolution adjustment data for the first surveillance image.

The leader agent UAV calculates second state data including absolute location information, relative location information, energy information required for flight and surveillance, and surveillance information using information input from the camera module and the sensor module, generates second movement action data and resolution adjustment data for a second surveillance image by inputting the second state data and the first state data received from the agent UAVs to a second neural network algorithm, and then flies according to the generated second movement action data and adjusts a surveillance range according to the resolution adjustment data for the second surveillance image.

The leader agent UAV may calculate an average of a plurality of pieces of state data each input from the agent UAVs when the number of agent UAVs is two or more, and may input the second state data and the calculated average of the plurality of pieces of state data to the second neural network algorithm.

The surveillance information included in the first state data may include a first image resolution and identification information of a first object to be monitored within the surveillance ranges of the agent UAVs, and the surveillance information included in the second state data may include a second image resolution and identification information of a second object to be monitored within the surveillance range of the leader agent UAV.

The plurality of UAVs may further include a non-agent UAV which does not communicate with other UAVs, and surveillance images each captured by the leader agent UAV, the agent UAVs, and the non-agent UAV may be transmitted to the UAV management device.

When the number of agent UAVs is two or more, an agent UAV closest to the non-agent UAV may fly around the non-agent UAV.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of achieving the same will be clearly understood from exemplary embodiments described in detail below in conjunction with the accompanying drawings. However, the present invention is not limited to the embodiments disclosed below and may be implemented in a variety of different forms. The exemplary embodiments are provided only to make disclosure of the present invention complete and fully convey the scope of the present invention to those skilled in the technical field to which the present invention pertains. The present invention is defined only by the claims. Throughout the drawings, like reference numerals refer to like elements.

Terminology used in this specification is for the purpose of describing specific embodiments and is not intended to limit the present invention. The singular forms may include the plural forms unless the context clearly indicates to the contrary. As used herein, the terms "include," "comprise," "have," etc. specify the existence of features, integers, steps, operations, elements, parts, or combinations thereof stated herein and do not exclude the existence or addition of one or more other features, integers, steps, operations, elements, parts, or combinations thereof.

As used herein, the terms "unit," "module," "device," "terminal," "server," "system," etc. are intended to indicate a combination of hardware and software run by the hardware. For example, the hardware may be a data processing device including a central processing unit (CPU) or another processor. Also, the software run by the hardware may be a running process, object, executable file, thread of executing, program, etc.

In the present specification, some operations or functions described as being performed by a terminal, an apparatus, or a device may be performed instead by a server connected to the terminal, the apparatus, or the device. Likewise, some operations or functions described as being performed by a server may be performed instead by a terminal, an apparatus, or a device connected to the server.

Figure 1:
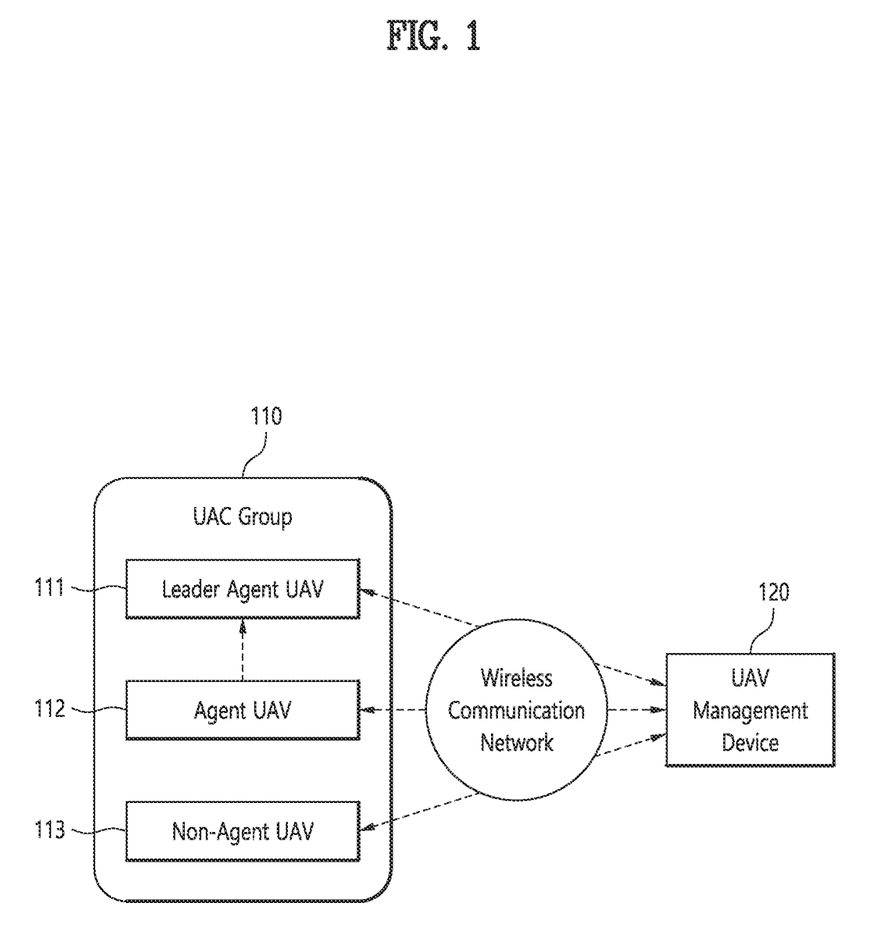
FIG. 1 is a diagram illustrating a surveillance system employing a plurality of unmanned aerial vehicles (UAVs) according to the present invention.

FIG. 1 is a diagram illustrating a surveillance system employing a plurality of unmanned aerial vehicles (UAVs) according to the present invention.

Referring to FIG. 1, the surveillance system employing a plurality of UAVs may overall include a UAV group 110 and a UAV management device 120 connected to the UAV group 110 through a wireless communication network. The wireless communication network may be implemented as a communication network in which UAVs transmit or receive a signal using a technique or standard such as Long Term Evolution (LTE), LTE-advanced (LTE-A), code division multiple access (CDMA), wideband CDMA (WCDMA), universal mobile telecommunications system (UMTS), wireless broadband (WiBro), or Global System for Mobile Communications (GSM).

The UAV group 110 may include a leader agent UAV 111 and agent UAVs 112. As another example, the UAV group 110 may further include non-agent UAVs 113.

The leader agent UAV 111 and the agent UAVs 112 are network devices that provide visual monitoring information to the UAV management device 120 while autonomously flying over an entire preset surveillance area. The leader agent UAV 111 and the agent UAVs 112 cooperate with each other while transmitting and receiving information through short-range communication.

The non-agent UAVs 113 are network devices that do not communicate with either of the leader agent UAV 111 and the agent UAVs 112 at all and provide visual monitoring information to the UAV management device 120 while autonomously flying over the entire surveillance area. As an example, the non-agent UAVs 113 may carry out surveillance during a hovering operation.

The UAV management device 120 is connected to the UAVs belonging to the UAV group 110 through a wireless network. The UAV management device 120 receives surveillance images captured by the leader agent UAV 111, the agent UAVs 112, and the non-agent UAVs 113. The UAV management device 120 may be implemented so that autonomous flying UAVs may be manually controlled by a manager at a remote place. The UAV management device 120 may transmit information on the entire surveillance area to the leader agent UAV 111, the agent UAVs 112, and the non-agent UAVs 113.

Figure 2:
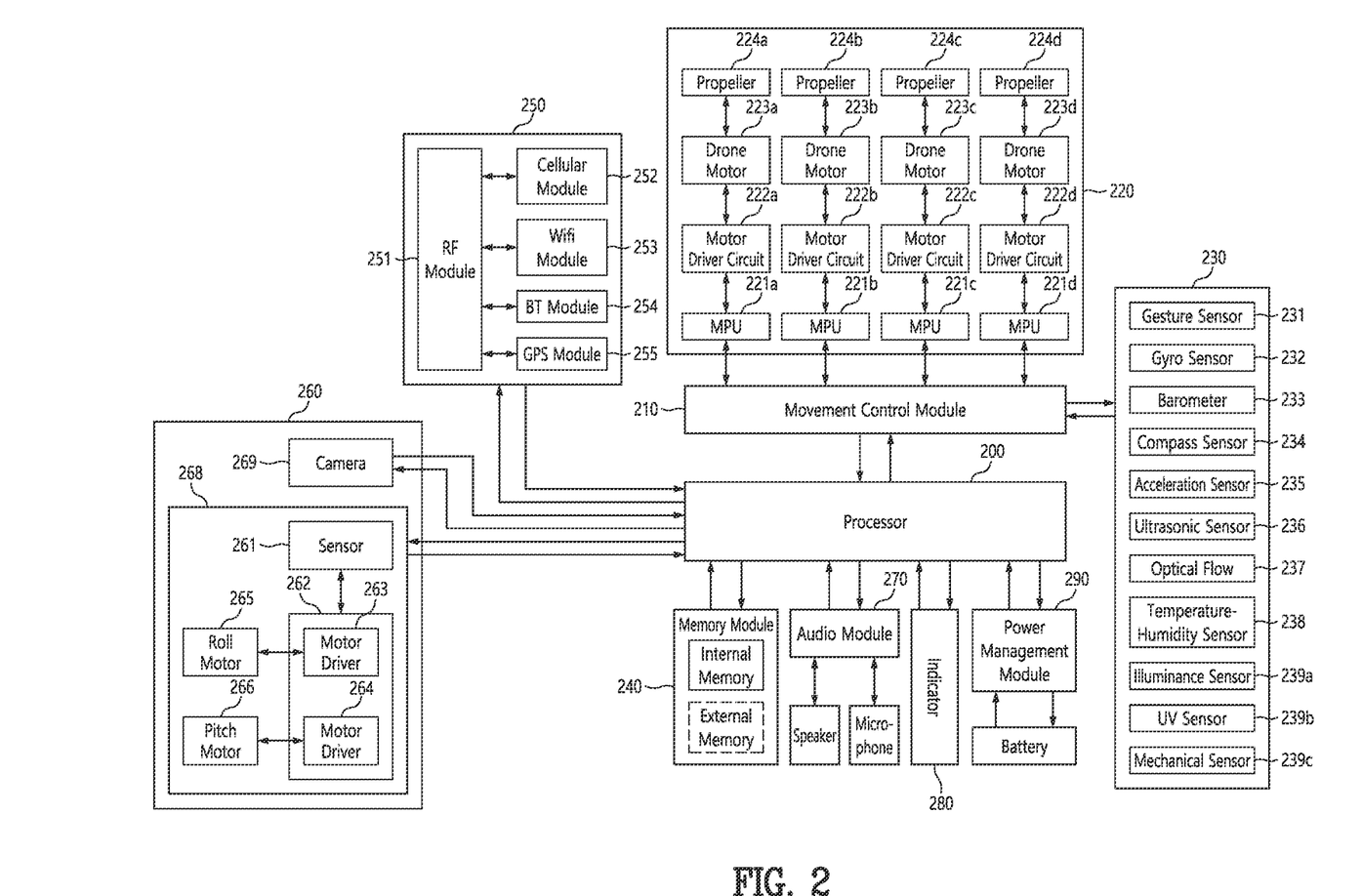
FIG. 2 is an example diagram illustrating a functional configuration of a UAV according to the present invention.

FIG. 2 is an example diagram illustrating a functional configuration of a UAV according to the present invention.

Referring to FIG. 2, the UAV may include a processor 200, a movement control module 210, a movement module 220, a sensor module 230, a memory module 240, a communication module 250, a camera module 260, an audio module 270, an indicator 280, and/or a power management module 290.

The processor 200 may control overall operations of the UAV. For example, the processor 200 may perform calculation of an application or data processing.

The movement control module 210 may control movement of the UAV using location and position information of the UAV. The movement control module 210 may include a flight control module and a position control module. On the basis of the location and position information of the UAV acquired by the position control module, the flight control module may control x-axis rotation (e.g., roll rotation), y-axis rotation (e.g., yaw rotation), z-axis rotation (e.g., pitch rotation), or movement (e.g., throttle) of the UAV. The movement control module 210 may control a hovering operation.

The movement module 220 may move the UAV under the control of the movement control module 210. When the UAV is a quadcopter, the movement module 220 may include microprocessor units (MPUs) 221a to 221d, motor driver circuits 222a to 222d, motors 223a to 223d, and propellers 224a to 224d. Each of the MPUs 221a to 221d may output a control signal for rotating at least one of the propellers 224a to 224d on the basis of a signal received from the movement control module 210.

The motor driver circuits 222a to 222d may convert respective control signals output from the MPUs 221a to 221d into driving signals and output the driving signals. The motors 223a to 223d may control rotation of the respective propellers 224a to 224d on the basis of the driving signals output from the motor driver circuits 222a to 222d, respectively.

The sensor module 230 may measure a physical quantity or detect an operation state of the UAV and convert the measured or detected information into an electrical signal. The sensor module 230 may include a gesture sensor 231 for detecting a motion and/or gesture of an object to be monitored recognized by the camera module 260, a gyro sensor 232 for measuring an angular velocity (or angular deviation) of the flying UAV, a barometer 233 for measuring a change in atmosphere pressure and/or the atmosphere pressure, a terrestrial magnetism sensor (compass sensor) 234 for measuring the Earth's magnetic field, an acceleration sensor 235 for measuring an acceleration of the flying UAV, an ultrasonic sensor 236 for measuring the distance between the object to be monitored and the UAV using an output ultrasonic wave, an optical flow 237 for recognizing a terrain or pattern of the bottom using the camera module 260 and calculating a location, a temperature-humidity sensor 238 for measuring a temperature and humidity, an illuminance sensor 239a for measuring an illumination, and/or an ultraviolet (UV) sensor 239b for measuring UV rays.

The sensor module 230 may provide information for controlling operations of the UAV to the movement control module 210. For example, the sensor module 230 may generate information for indicating a position of the UAV using the gyro sensor 232 and the acceleration sensor 235. In the case of generating information for indicating a position of the UAV, the sensor module 230 may increase an output of the terrestrial magnetism sensor 234 to prevent the drift of the gyro sensor 232.

The memory module 240 may include an internal memory and an external memory. The memory module 240 may store commands or data related to at least one other element of the UAV. The memory module 240 may store software and/or programs. The programs may include a kernel, middleware, an application programming interface (API), an application, etc. One or more of the kernel, the middleware, and the API may be designated as an operating system (OS).

The communication module 250 may be a wireless communication module. The communication module 250 may include a radio frequency (RF) module 251, a cellular module 252, a Wi-Fi module 253, a Bluetooth (BT) module 254, and/or a Global Positioning System (GPS) module 255. The RF module 251 may control the UAV so that the UAV transmits or receives a signal. The cellular module 252 may interoperate with the RF module 251 to control transmission or reception of a signal by the UAV on the basis of a technique or standard such as LTE, LTE-A, CDMA, WCDMA, UMTS, WiBro, or GSM. The Wi-Fi module 253 may interoperate with the RF module 251 to control transmission or reception of a signal by the UAV using a wireless local area network (WLAN) service. The BT module 254 may interoperate with the RF module 251 to control transmission or reception of a signal by the UAV using a direct proximity communication service.

The GPS module 255 may output information on a location (e.g., a longitude, a latitude, an altitude, a GPS speed, etc. of the UAV). Also, the GPS module 255 may output information on a reference time.

The camera module 260 may include a camera 269 and/or a gimbal 268. The gimbal 268 may include a gimbal controller 262, a gyro/acceleration sensor 261, motor drivers 263 and 264, and/or motors 265 and 266. The camera module 260 may include a lens, an image sensor, an image signal processor, a camera controller, etc. The lens may perform a function of focusing using the properties of straightness and refraction of light and a function of enlarging/shrinking (zooming in/out on) the object to be monitored. The image sensor may have the structure of a complementary metal-oxide semiconductor (CMOS) image sensor or a charge-coupled device (CCD).

The image signal processor may include an image preprocessor which performs operations, such as auto white balance (AWB), auto exposure (AE), auto focusing (AF), extraction and processing, lens shading correction, etc., on each of subframe images and an image postprocessor which performs color interpolation, an image processing chain (IPC), color conversion, etc. Also, the image signal processor may include an encoder that may encode processed images and a decoder that may decode encoded images.

The camera controller may adjust the composition and/or camera angle (imaging angle) of the object to be monitored by adjusting an up, down, left, or right angle of the lens on the basis of composition information and/or camera control information output by the processor 200. The gimbal 268 may control the tilt of the camera 269 so that the camera 269 maintains its position regardless of movement of the UAV. The gimbal 268 may include the sensor 261, the gimbal controller 262, and the motor drivers 263 and 264.

The sensor 261 may include a gyro sensor and an acceleration sensor and recognize movement of the UAV. The gimbal controller 262 may recognize the movement of the UAV by analyzing a measured value of the sensor 261. The gimbal controller 262 may generate compensation data according to the movement of the UAV. The compensation data may control x-axis rotation (e.g., roll rotation) and z-axis rotation (e.g., pitch rotation) of the camera module 260. The gimbal 268 may provide data for compensating for one or more of x-axis rotation and z-axis rotation of the camera module 260 to one or more of the roll motor 265 and the pitch motor 266. One or more of the roll motor 265 and the pitch motor 266 may compensate for one or more of roll rotation and pitch rotation of the camera module 260 according to the movement of the UAV.

The audio module 270 may convert sound into an electrical signal and vice versa. The audio module 270 may process sound information output through a speaker, a receiver, an earphone, etc. The audio module 270 may process sound information input through a microphone and the like. An indicator 280 may display a specific state of the processor 200, for example, a booting state, a message state, or a charging state. The power management module 290 checks a remaining battery level and transmits the remaining battery level to the processor 200.

Figure 3:
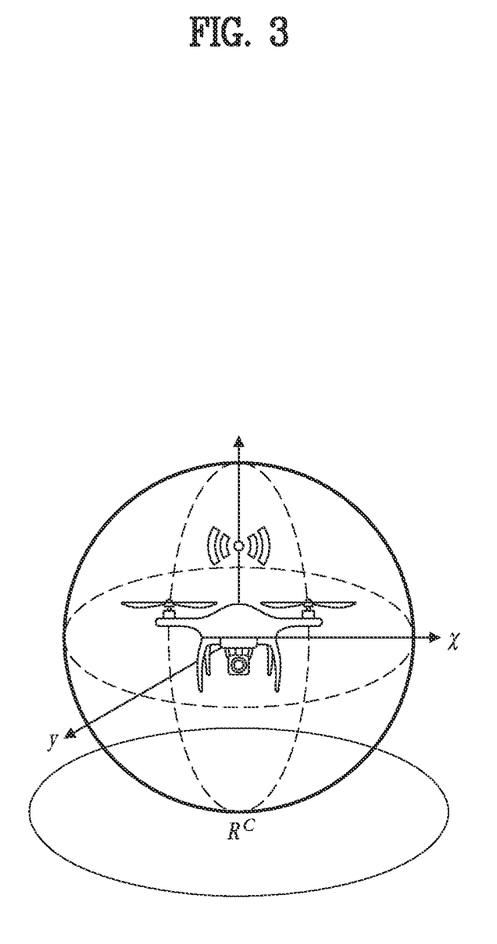
FIG. 3 is an example diagram illustrating location coordinates of a UAV according to the present invention.

FIG. 3 is an example diagram illustrating location coordinates of a UAV according to the present invention.

Referring to FIG. 3, location coordinates of a UAV may be generally represented as an x-axis coordinate, a y-axis coordinate, and a surveillance range $R^C$. In the present invention, the UAV is implemented so that the surveillance range $R^C$ is inversely proportional to an image resolution. For example, when the resolution of a surveillance image is 2160P, the surveillance range $R^C$ is 40×40, and when the resolution of a surveillance image is 1080P, the surveillance range $R^C$ is 80×80.

Figure 4:
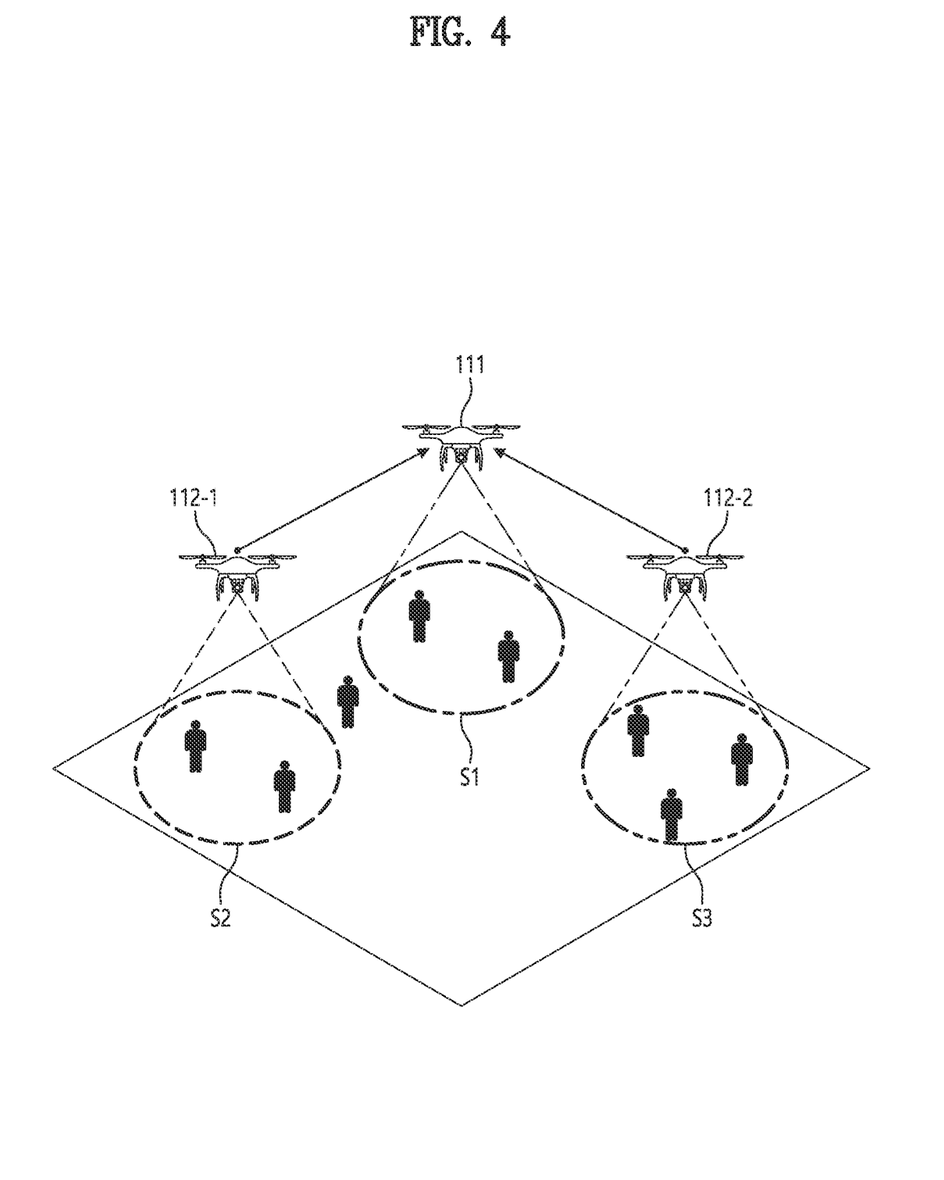
FIGS. 4 and 5 are example diagrams illustrating a surveillance operation of a plurality of UAVs according to the present invention.
Figure 5:
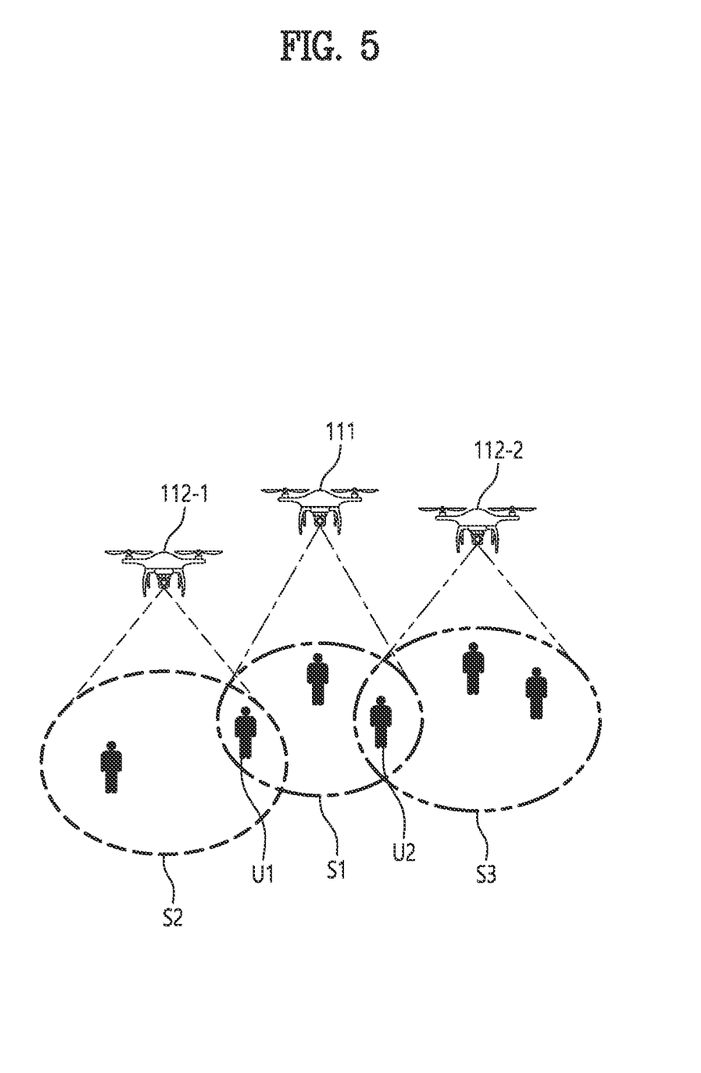

FIGS. 4 and 5 are example diagrams illustrating a surveillance operation of a plurality of UAVs according to the present invention. FIGS. 4 and 5 are described on the assumption that the plurality of UAVs include one leader agent UAV 111 and two agent UAVs 112-1 and 112-2, but the number of agent UAVs of the present invention may be two or more.

Referring to FIG. 4, the leader agent UAV 111 images objects to be monitored within a surveillance range S1, and the two agent UAVs 112-1 and 112-2 image objects to be monitored within surveillance ranges S2 and S3, respectively. The sizes of the surveillance ranges have the following relation: S1<S2<S3. Accordingly, the leader agent UAV 111 has the highest surveillance image resolution.

Each of the leader agent UAV 111 and the two agent UAVs 112-1 and 112-2 includes a sensor module, a communication module, a memory module, a movement control module, a processor, a battery, and a power management module.

The two agent UAVs 112-1 and 112-2 calculate first state data including absolute location information, relative location information, energy information, and surveillance information using information input from the sensor modules.

The absolute location information may include a longitude, a latitude, and an altitude acquired from the GPS module. The relative location information may include the distance from another UAV or location information based on that distance, and the distance from an object to be monitored. The energy information is information on battery power consumption required for communication, flight, and surveillance. The surveillance information may include identification information of the object to be monitored and a surveillance image resolution.

The two agent UAVs 112-1 and 112-2 transmit the calculated first state data to the leader agent UAV 111 and also generate first movement action data and resolution adjustment data for a first surveillance image by inputting the first state data to a first neural network algorithm. The first neural network algorithm used in the two agent UAVs 112-1 and 112-2 may be an artificial neural network (ANN) or a deep neural network (DNN).

The ANN includes three layers in total, an input layer, a hidden layer, and an output layer. The ANN may be implemented as hardware but is mainly implemented as computer software. In the ANN, several neurons which are basic computing units are connected through weighted links. The weighted links may adjust weights to adapt to a given environment. The DNN denotes an ANN obtained by stacking several hidden layers.

The two agent UAVs 112-1 and 112-2 fly according to the first movement action data generated by the first neural network algorithm and adjust surveillance ranges according to the resolution adjustment data for a first surveillance image generated by the first neural network algorithm. The first movement action data may have a value of ±α on the x-axis, a value of ±α on the y-axis, or a value of ±β on both the x-axis and y-axis.

The leader agent UAV 111 calculates second state data including absolute location information, relative location information, energy information, and surveillance information using information input from the sensor module. The absolute location information may include a longitude, a latitude, and an altitude acquired from the GPS module. The relative location information may include the distance from another UAV or location information based on that distance, and the distance from an object to be monitored. The energy information is information on battery power consumption required for communication, flight, and surveillance. The surveillance information may include identification information of the object to be monitored and a surveillance image resolution.

The leader agent UAV 111 generates second movement action data and resolution adjustment data for a second surveillance image by inputting the second state data and the first state data received from the two agent UAVs 112-1 and 112-2 to a second neural network algorithm. In other words, the second neural network algorithm used in the leader agent UAV 111 is a large feed-forward network that receives state data of other agent UAVs and outputs action data, unlike an ANN or a DNN. The second neural network algorithm will be described below with reference to FIG. 9.

The leader agent UAV 111 flies according to the second movement action data generated by the second neural network algorithm and adjusts a surveillance range according to the resolution adjustment data for a second surveillance image generated by the second neural network algorithm. The second movement action data may have a value of ±α on the x-axis, a value of ±α on the y-axis, or a value of ±β on both the x-axis and y-axis.

Referring to FIG. 5, the surveillance range of the leader agent UAV 111 is S1, and the surveillance ranges of the two agent UAVs 112-1 and 112-2 are S2 and S3, respectively. The sizes of the surveillance ranges have the following relation: S1<S2<S3. Accordingly, the leader agent UAV 111 has the highest surveillance image resolution.

In FIG. 5, among objects to be monitored within the surveillance range S1 of the leader agent UAV 111, U1 belongs to both the surveillance range S2 of the agent UAV 112-1 and the surveillance range S3 of the agent UAV 112-2. With regard to such objects to be monitored at which surveillance ranges overlap, the leader agent UAV 111 compares the surveillance image resolution thereof with the surveillance image resolutions included in the surveillance information of the other agent UAVs.

Since the leader agent UAV 111 has the highest surveillance image resolution in FIG. 5, U1 and U2 among objects to be monitored are included in the surveillance information of the leader agent UAV 111. The surveillance information is state data input to the second neural network algorithm by the leader agent UAV 111, and movement action data and resolution adjustment data for a surveillance image output from the second neural network algorithm may vary depending on the surveillance information.

Figure 6:
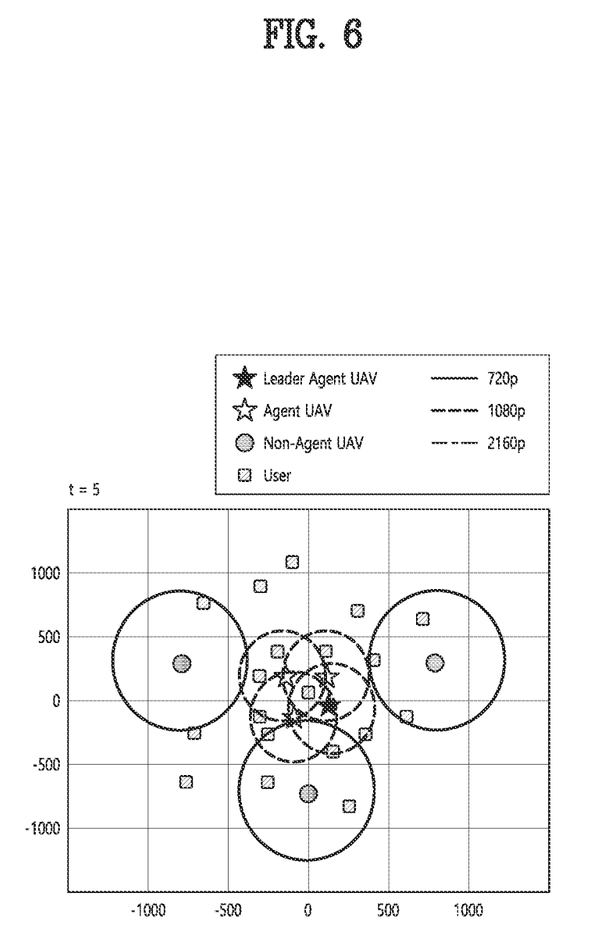
FIGS. 6 to 8 are example diagrams illustrating flight simulation of a plurality of UAVs according to the present invention.
Figure 7:
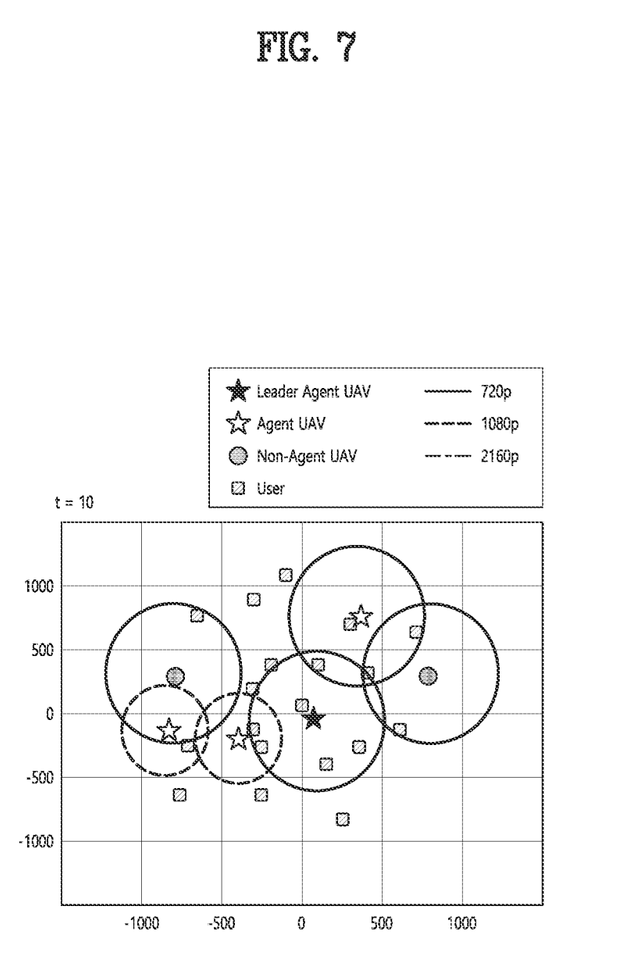
Figure 8:
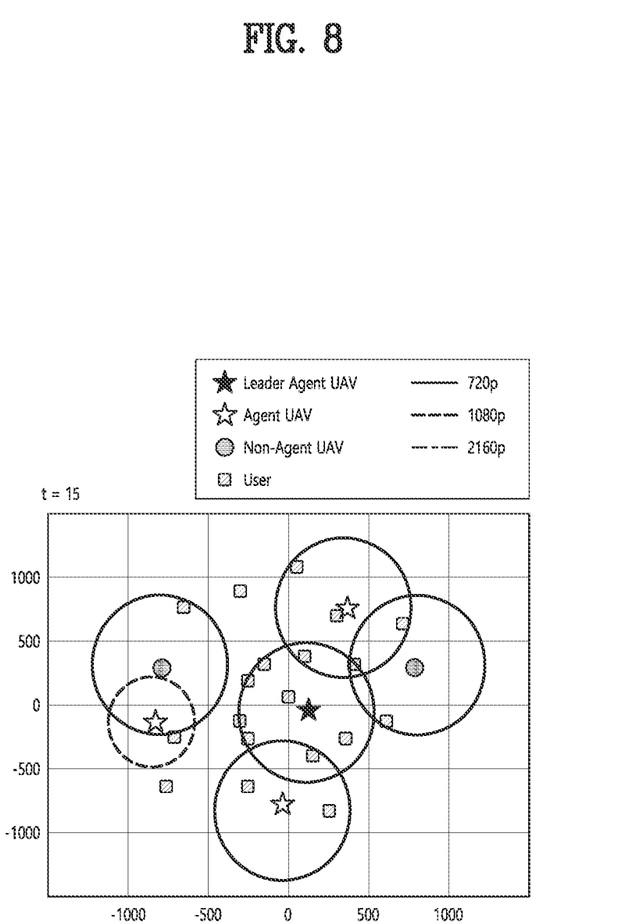

FIGS. 6 to 8 are example diagrams illustrating flight simulation of a plurality of UAVs according to the present invention. A total of seven UAVs are used for flight simulation, that is, one leader agent UAV, three agent UAVs, and three non-agent UAVs. The three non-agent UAVs perform a hovering operation, and a surveillance image resolution is set to 720P.

Referring to FIG. 6, the leader agent UAV, the three agent UAVs, and the three non-agent UAVs move over a surveillance area for t=5 seconds. The leader agent UAV, the three agent UAVs, and the three non-agent UAVs are set with the same surveillance image resolution of 1080P.

Each of the three agent UAVs calculates its own state data, generates first movement action data and first surveillance image resolution adjustment data by inputting the state data to a first neural network algorithm, and then flies according to the generated first movement action data and adjusts its surveillance range according to the first surveillance image resolution adjustment data. Each of the three agent UAVs flies around the closest non-agent UAV.

The leader agent UAV receives state data from the three agent UAVs. The leader agent UAV calculates an average of the state data of the three agent UAVs. The leader agent UAV calculates its own state data and then generates second movement action data and second surveillance image resolution adjustment data by inputting its own state data and the average of the state data of the three agent UAVs to a second neural network algorithm. The leader agent UAV flies according to the second movement action data and adjusts its surveillance range according to the second surveillance image resolution adjustment data.

FIG. 7 shows locations and surveillance image resolutions of the leader agent UAV and the three agent UAVs at t=10 seconds. The leader agent UAV operates to enlarge its surveillance range and increase the number of objects to be monitored by reducing its surveillance image resolution. Each of the three agent UAVs flies around the closest non-agent UAV.

The three non-agent UAVs transmit surveillance images captured by the camera modules during a hovering operation to a UAV management device. FIG. 7 shows that one of the three non-agent UAVs malfunctions, for example, in the case of a low battery or a module failure.

FIG. 8 shows locations and surveillance image resolutions of the leader agent UAV and the three agent UAVs at t=15 seconds. FIG. 8 shows that an agent UAV closest to the malfunctioning one of the three non-agent UAVs flies around the malfunctioning non-agent UAV. The leader agent UAV flies to have a location and its surveillance range in which there are the largest number of objects to be monitored, and the agent UAVs fly to monitor objects to be monitored outside the surveillance range of the leader agent UAV.

Figure 9:
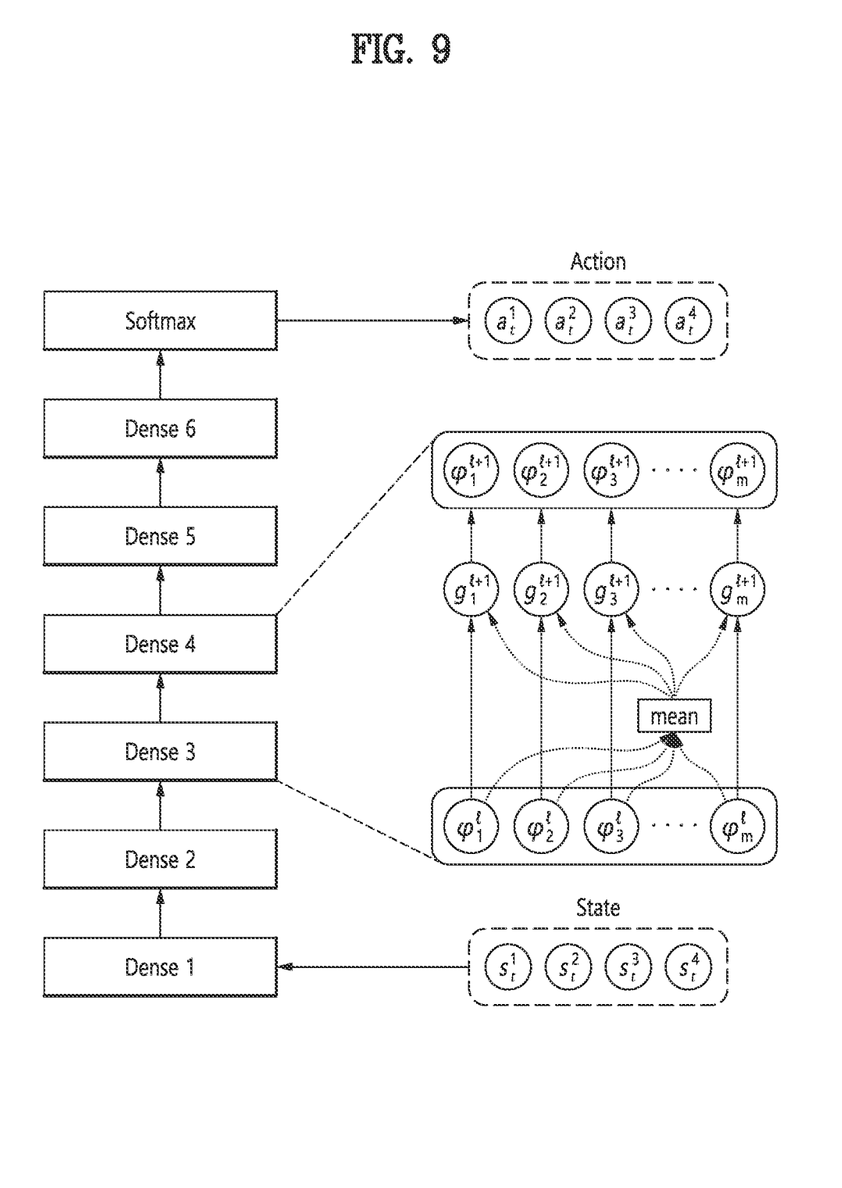
FIG. 9 is an example diagram illustrating a neural network algorithm implemented in a leader agent UAV according to the present invention.

FIG. 9 is an example diagram illustrating a neural network algorithm implemented in a leader agent UAV according to the present invention.

"Dense" is the most basic form of a neural network structure and is a layer that connects all inputs to all outputs. It is generally called a dense connected layer or a fully connected layer. A neural network algorithm implemented in a leader agent UAV includes Dense 1 to Dense 6 and an output layer employing a softmax function.

All state data is input to Dense 1 and passes through Dense 1 to Dense 6, and finally, the output layer employing the softmax function generates a movement action and a surveillance image resolution adjustment action.

Figure 10:
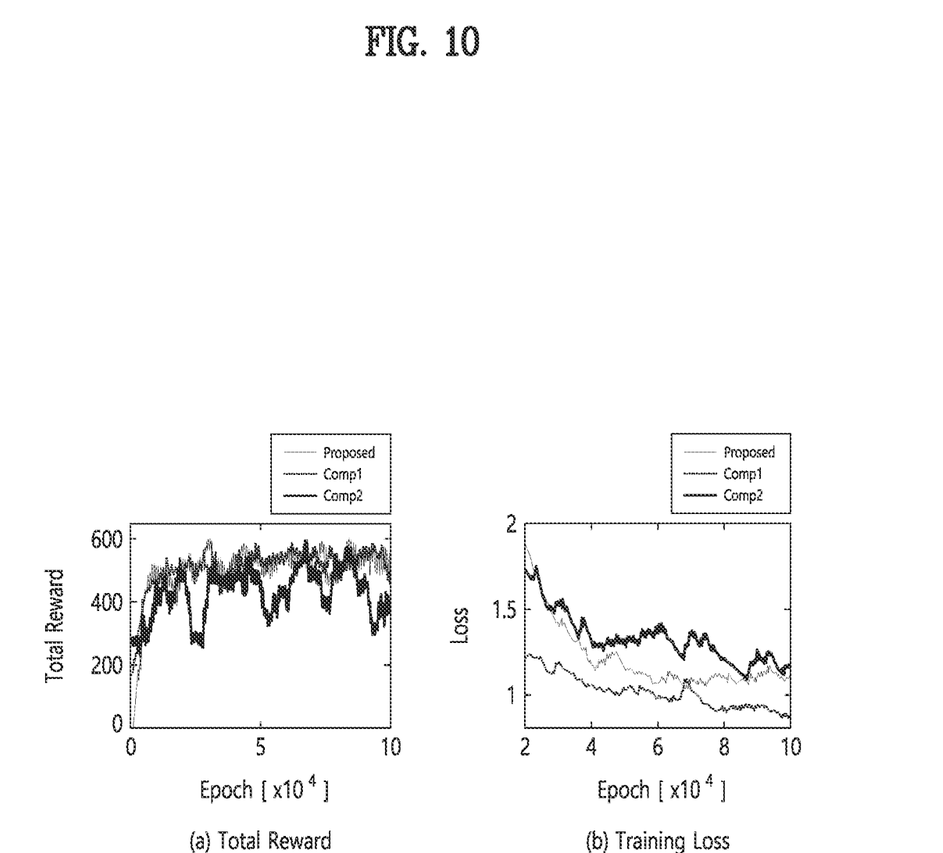
FIGS. 10 to 12 are graphs illustrating simulation results of a surveillance system employing a plurality of UAVs according to the present invention.
Figure 11:
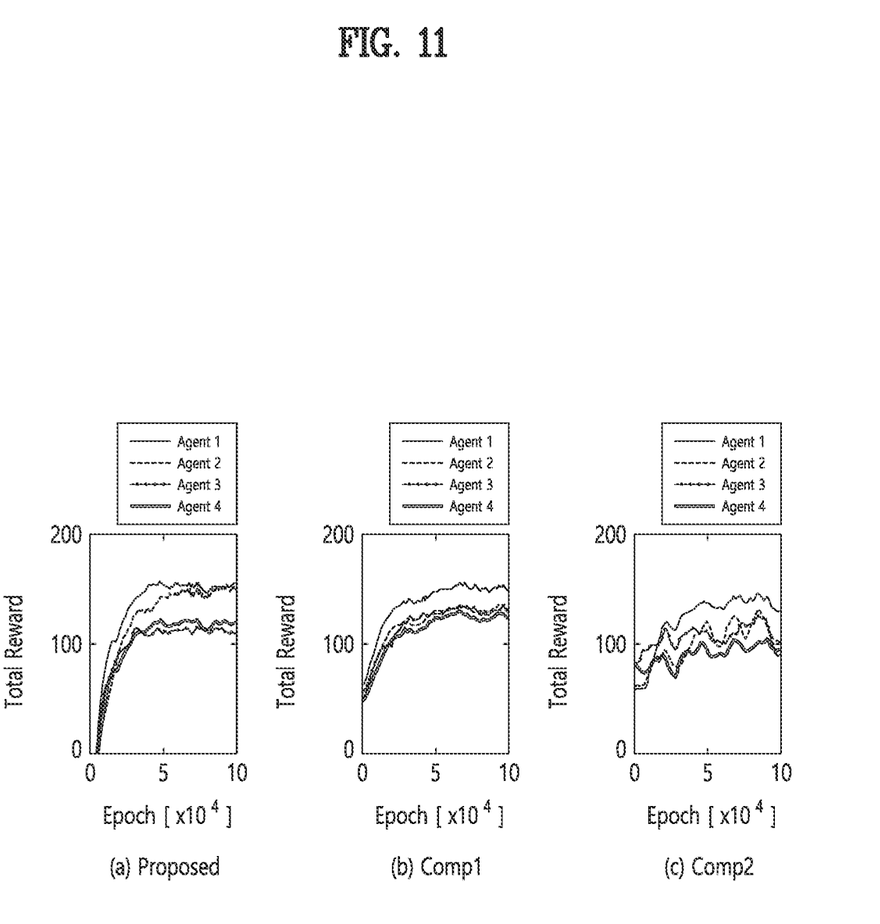
Figure 12:
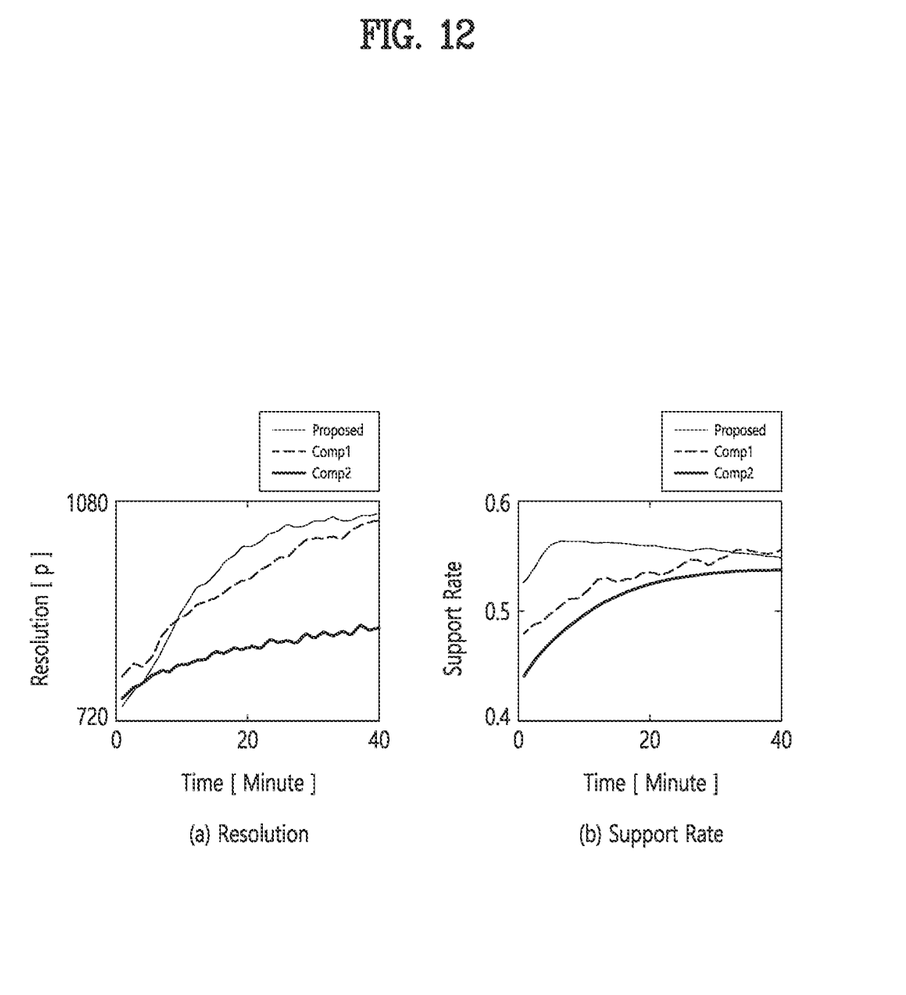

FIGS. 10 to 12 are graphs illustrating simulation results of a surveillance system employing a plurality of UAVs according to the present invention. Here, an exemplary embodiment of the present invention corresponds to Proposed, and comparative examples correspond to Comp1 and Comp2.

According to the exemplary embodiment Proposed of the present invention, the simulation was carried out using one leader agent UAV and three agent UAVs, whereas the simulation was carried out using only four leader agent UAVs according to the comparative example Comp1 and the simulation was carried out using only four non-agent UAVs according to the comparative example Comp2.

Referring to the test results of surveillance reward in FIG. 10A and surveillance loss in FIG. 10B, the exemplary embodiment Proposed of the present invention and the comparative example Comp1 showed similar performance, and the comparative example Comp2 showed lower performance.

A surveillance reward is defined as a ratio of the number of users within a current surveillance range to the number of users within the maximum surveillance range. The surveillance reward of each of the four UAVs shown in FIG. 11A according to the exemplary embodiment Proposed of the present invention is similar to the surveillance reward of each of the four UAVs shown in FIG. 11B according to the comparative example Comp1, and the surveillance reward of each of the four UAVs shown in FIG. 11C according to the comparative example Comp2 is lower than those of the exemplary embodiment Proposed and the comparative example Comp1.

Referring to a change in surveillance image resolution over time in FIG. 12A and a change in support rate over time in FIG. 12B, the exemplary embodiment Proposed of the present invention showed higher performance than the comparative examples Comp1 and Comp2.

According to any one of the above-described embodiments of the present invention, a surveillance system employing a plurality of UAVs runs agent UAVs which calculate movement actions and resolution adjustment data for surveillance images through a first neural network algorithm, fly according to the movement actions, and adjust surveillance ranges according to the resolution adjustment data, and a leader agent UAV which calculates a movement action and resolution adjustment data for a surveillance image using state data of the agent UAVs as input values for a second neural network algorithm while communicating with the agent UAVs, flies according to the movement action, and adjusts a surveillance range according to the resolution adjustment data. Accordingly, it is possible to improve surveillance performance while optimizing common energy consumption for computing of all the UAVs.

Also, a surveillance system employing a plurality of UAVs runs one leader agent UAV, two or more agent UAVs which communicate with the leader agent UAV, and a non-agent UAV which does not communicate with other UAVs. Accordingly, it is possible to provide a stable visual monitoring service using autonomous mobility of the UAVs regardless of movement of an object to be monitored and action uncertainty of an adjacent UAV.

Further, when a surveillance system employing a plurality of UAVs according to the present invention is used in industries, security companies, farms, etc., it is possible to reduce manpower and show far better performance than surveillance systems according to the related art.

Although the present invention has been described above with reference to specific details, such as specific elements, limited embodiments and drawings, these are only provided to help general understanding of the present invention, and the present invention is not limited to the embodiments. Various modifications and alterations can be made from the description by those of ordinary skill in the art.

Therefore, the spirit of the present invention should not be limited to the above-described embodiments, and not only the following claims but also all modifications equivalent thereto fall within the scope of the present invention.

What is claimed is:

1. A surveillance system employing a plurality of unmanned aerial vehicles (UAVs) each of which communicates with a UAV management device through a wireless communication network and includes a camera module, a sensor module, a communication module, a memory module, a movement module, a movement control module, a processor, a battery, and a power management module, wherein the plurality of UAVs include agent UAVs and a leader agent UAV which wirelessly communicates with the agent UAVs,
  wherein the agent UAVs calculate first state data including absolute location information, relative location information, energy information required for flight and surveillance, and surveillance information using information input from the camera modules and the sensor modules, transmit the first state data to the leader agent UAV, generate first movement action data and resolution adjustment data for a first surveillance image by inputting the first state data to a first neural network algorithm, and then fly according to the generated first movement action data and adjust surveillance ranges according to the resolution adjustment data for the first surveillance image,
  wherein the leader agent UAV calculates second state data including absolute location information, relative location information, energy information required for flight and surveillance, and surveillance information using information input from the camera module and the sensor module, generates second movement action data and resolution adjustment data for a second surveillance image by inputting the second state data and the first state data received from the agent UAVs to a second neural network algorithm, and then flies according to the generated second movement action data and adjusts a surveillance range according to the resolution adjustment data for the second surveillance image, and
  wherein the leader agent UAV calculates an average of a plurality of pieces of state data each input from the agent UAVs when the number of agent UAVs is two or more, and inputs the second state data and the calculated average of the plurality of pieces of state data to the second neural network algorithm.

2. The surveillance system of claim 1, wherein the surveillance information included in the first state data includes a first image resolution and identification information of a first object to be monitored within the surveillance ranges of the agent UAVs, and
  wherein the surveillance information included in the second state data includes a second image resolution and identification information of a second object to be monitored within the surveillance range of the leader agent UAV.

3. The surveillance system of claim 1, wherein the plurality of UAVs further include a non-agent UAV which does not communicate with other UAVs, and
  wherein surveillance images each captured by the leader agent UAV, the agent UAVs, and the non-agent UAV are transmitted to the UAV management device.

4. The surveillance system of claim 3, wherein, when the number of agent UAVs is two or more, an agent UAV closest to the non-agent UAV flies around the non-agent UAV.

5. A surveillance system employing a plurality of unmanned aerial vehicles (UAVs) each of which communicates with a UAV management device through a wireless communication network and includes a camera module, a sensor module, a communication module, a memory module, a movement module, a movement control module, a processor, a battery, and a power management module, wherein the plurality of UAVs include agent UAVs and a leader agent UAV which wirelessly communicates with the agent UAVs,
  wherein the agent UAVs calculate first state data including absolute location information, relative location information, energy information required for flight and surveillance, and surveillance information using information input from the camera modules and the sensor modules, transmit the first state data to the leader agent UAV, generate first movement action data and resolution adjustment data for a first surveillance image by inputting the first state data to a first neural network algorithm, and then fly according to the generated first movement action data and adjust surveillance ranges according to the resolution adjustment data for the first surveillance image,
  wherein the leader agent UAV calculates second state data including absolute location information, relative location information, energy information required for flight and surveillance, and surveillance information using information input from the camera module and the sensor module, generates second movement action data and resolution adjustment data for a second surveillance image by inputting the second state data and the first state data received from the agent UAVs to a second neural network algorithm, and then flies according to the generated second movement action data and adjusts a surveillance range according to the resolution adjustment data for the second surveillance image,
  wherein the plurality of UAVs further include a non-agent UAV which does not communicate with other UAVs,
  wherein surveillance images each captured by the leader agent UAV, the agent UAVs, and the non-agent UAV are transmitted to the UAV management device, and
  wherein, when the number of agent UAVs is two or more, an agent UAV closest to the non-agent UAV flies around the non-agent UAV.

6. The surveillance system of claim 5, wherein the leader agent UAV calculates an average of a plurality of pieces of state data each input from the agent UAVs when the number of agent UAVs is two or more, and inputs the second state data and the calculated average of the plurality of pieces of state data to the second neural network algorithm.

7. The surveillance system of claim 5, wherein the surveillance information included in the first state data includes a first image resolution and identification information of a first object to be monitored within the surveillance ranges of the agent UAVs, and
  wherein the surveillance information included in the second state data includes a second image resolution and identification information of a second object to be monitored within the surveillance range of the leader agent UAV.

* * * * *